United States Patent [19]

Olez et al.

[11] Patent Number: 4,863,330
[45] Date of Patent: Sep. 5, 1989

[54] COMPOSITE FASTENER AND METHOD OF MANUFACTURE

[75] Inventors: Nejat A. Olez, Rancho Pales Verdes; Flerida B. Uldrich, Long Beach, both of Calif.

[73] Assignee: Northrop Corporation, Hawthorne, Calif.

[21] Appl. No.: 73,593

[22] Filed: Jul. 15, 1987

[51] Int. Cl.[4] .......................... F16B 19/06; F16B 35/04
[52] U.S. Cl. ..................................... 411/424; 411/504; 411/901; 411/908
[58] Field of Search ......................... 411/501, 504–507, 411/503, 411, 424, 361, 366, 900, 901, 902, 907, 908; 264/32, 33

[56] References Cited

U.S. PATENT DOCUMENTS

| | | | |
|---|---|---|---|
| 4,478,544 | 10/1984 | Strand | 411/908 |
| 4,659,268 | 4/1987 | Del Mundo et al. | 411/901 |
| 4,687,394 | 8/1987 | Berecz | 411/361 |
| 4,687,395 | 8/1987 | Berecz | 411/901 |
| 4,687,396 | 8/1987 | Berecz | 411/908 |
| 4,687,397 | 8/1987 | Berecz | 411/361 |
| 4,687,398 | 8/1987 | Berecz | 411/908 |
| 4,718,801 | 1/1988 | Berecz | 411/908 |

FOREIGN PATENT DOCUMENTS 2705336 8/1978 Fed. Rep. of Germany ...... 411/424

*Primary Examiner*—Neill R. Wilson
*Attorney, Agent, or Firm*—Terry J. Anderson; Robert B. Block

[57] ABSTRACT

An essentially cylindrical, light weight, composite fastener formed of an interior cylindrical core member, a cone-shaped molded insert plug member in the first or head end of the core, and an exterior cup-shaped overwrap member. Threads are formed at the second or threaded end of the fastener. All of the components are fabricated of an organic resin material with high-modulus fibers embedded therein. The fibers of the exterior member are long and continuous while the fibers of the other members are short and chopped. All the fibers are essentially parallel with the axis of the fastener. The resin material is preferably polyetheretherketone and the fibers are preferably graphite. Also disclosed is the method of manufacturing the above described fastener.

18 Claims, 2 Drawing Sheets

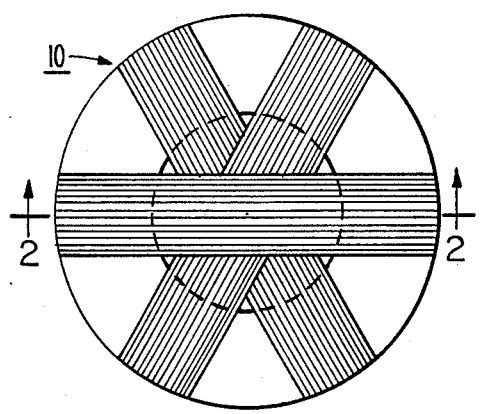
FIG. 1.
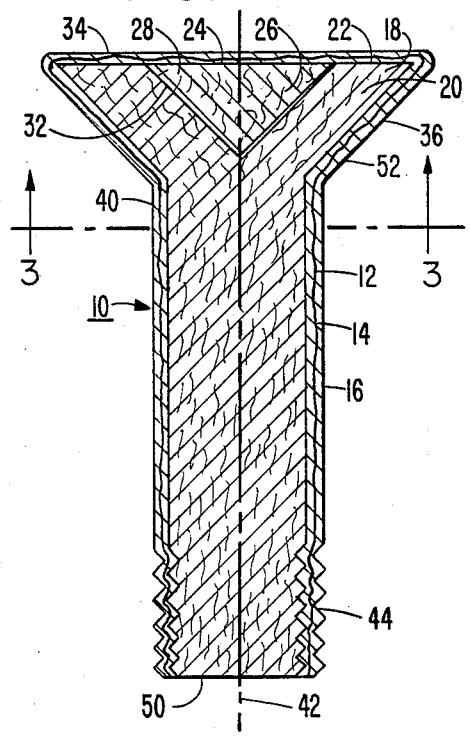
FIG. 2.
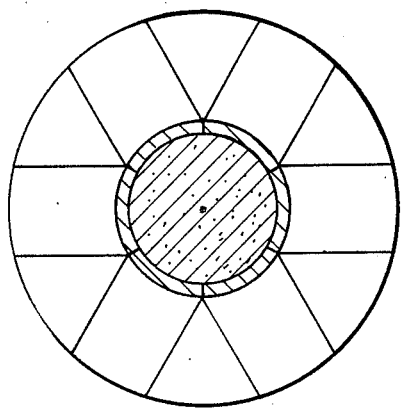
FIG. 3.
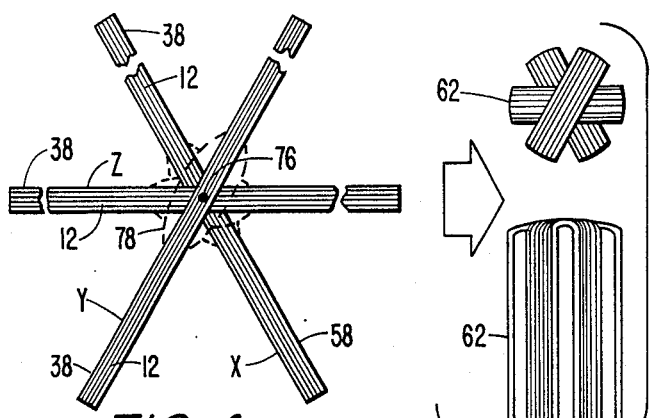
FIG. 4a. FIG. 4b.
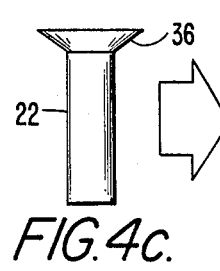
FIG. 4c.
FIG. 4d.
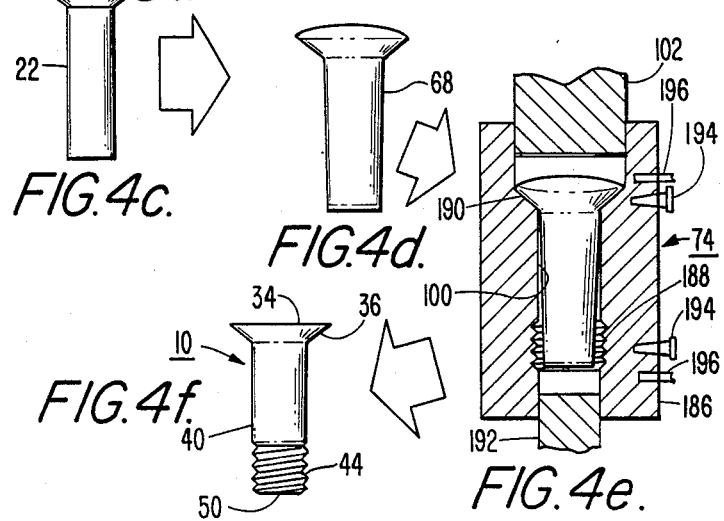
FIG. 4e.
FIG. 4f.
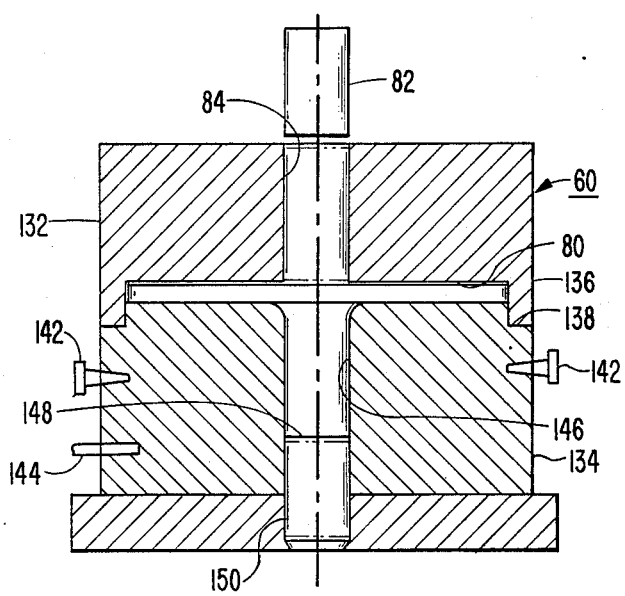
FIG. 9.

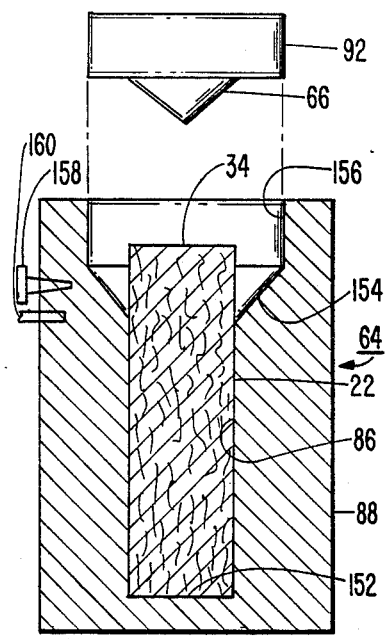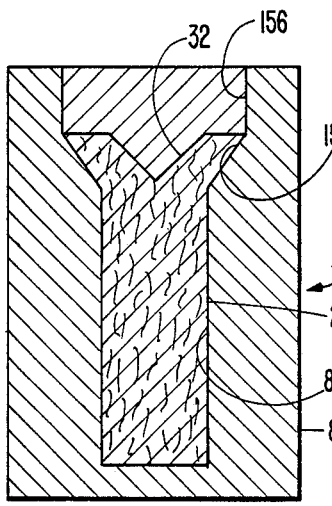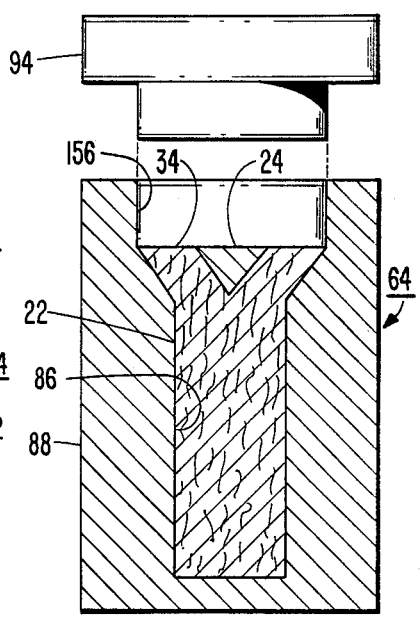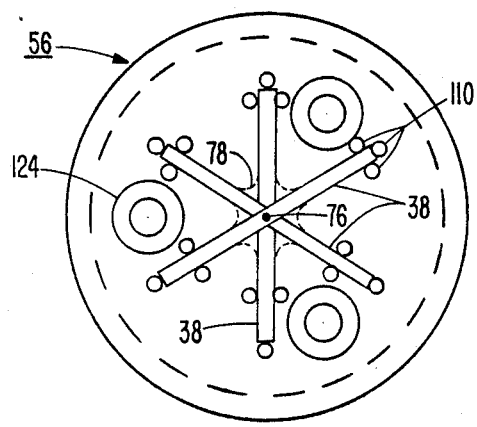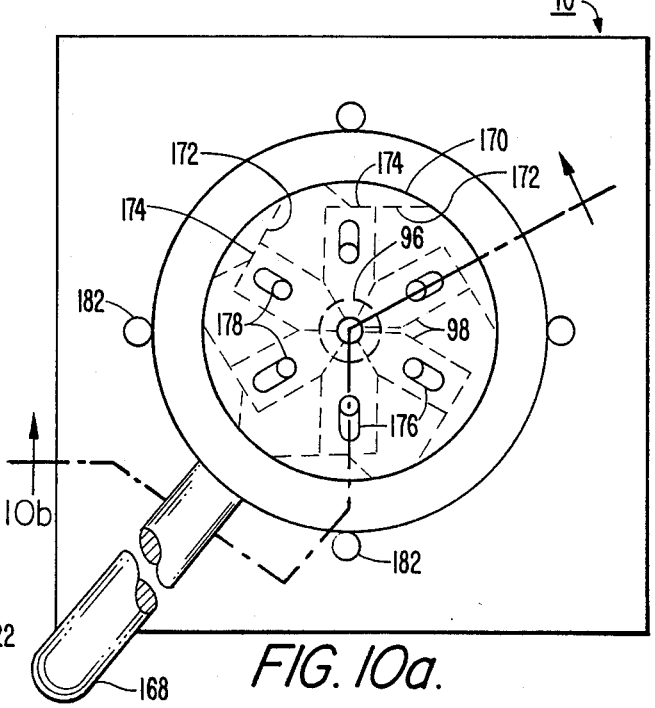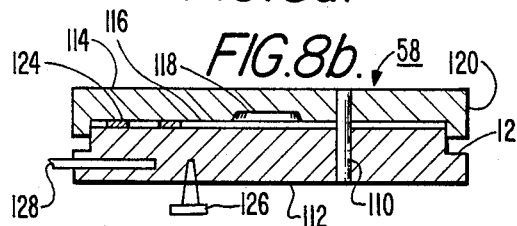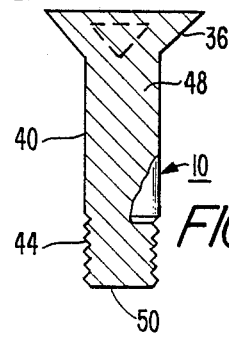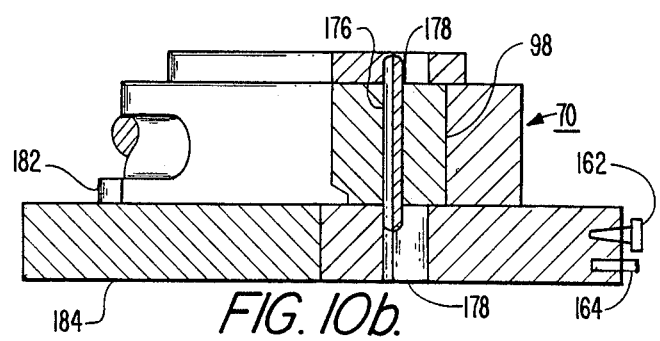

COMPOSITE FASTENER AND METHOD OF MANUFACTURE

BACKGROUND OF THE INVENTION

1. Field of the Invention

This invention relates generally to strong, yet light weight articles, such as fastener elements and, more particularly, to composite fasteners. The invention also relates to methods of manufacturing such fasteners.

2. Description of the Prior Art

Many types of light weight fasteners have been developed and utilized for securing together certain highly stressed components, such as aircraft parts. For such applications the fasteners usually require high strength and light weight. Virtually all of the prior types of fasteners for such applications have had some advantages and several disadvantages.

One common type of prior light weight fastener includes those fabricated with a light weight metallic core material to which a different metallic material is applied as a thin protective coating. Such coating may be applied by plating, galvanizing, or other application method. In such fastener design, the reduction in weight normally results in a corresponding reduction in strength along with a corresponding reduction in the ability of the fastener to withstand one or more of the stresses to which it may be subjected.

Another common type of prior light weight fastener includes those with a molded, non-metallic core material coated with a layer of metal. Such design provides for light weight fasteners without a significant increase in size. Such fasteners, however, typically have limited strength and are unlikely to withstand severe stress and tension forces. Also, during use of such fasteners in metallic structures, the relatively thin metallic coating is often quickly abraded or otherwise destroyed permitting components secured by the fastener to act against the more fragile core material. Thus, under high stress conditions failures may occur by the cutting or shearing of the core.

Illustrative of another prior approach to light weight fasteners is that disclosed in U.S. Pat. No. 3,495,494 to Scott. This patent discloses the fabrication of a hollow threaded fastener of resin impregnated glass fiber filaments. A cylinder of parallel filaments is first formed about an interior mold. The fibers and resin of the cylinder are then forced against an external mold by means of a pressurized fluid which may be injected into the interior. This pressurized fluid does not become part of the fastener. Alternatively, the bundle of fibers may be compressed by applying a force through movable sections of an external mold, or the bundle of fibers may be compressed internally against the mold by means of an inflatable central mandrel.

Another example of fabricating light weight fasteners of resin material reinforced by parallel threads or fibers of material, such as glass, is shown in U.S. Pat. No. 3,382,050 to Boggs. In accordance with that disclosure, a unidirectional cylinder of fibers is placed in the mold at one end and liquid resin material is fed into a passage maintained at either cool or warmer temperatures by means of the circulation of a temperature modifying medium within the hollow jackets. The fiber cylinder and the resin are continuously fed into the upper end of the mold and a cured threaded fastener rod is continuously removed from the lower end of the mold. The removed material is subsequently cut to length. The resulting fastener is thus formed of a resin compound reinforced with axially oriented fibrous material with a hollow interior. While suitable for a number of applications, this fastener structure, like the Scott fastener, does not appear to be sufficiently strong to withstand the tension forces typically encountered in an airframe environment without sever size penalties.

A fastener structure of plastic molded around a metal core is shown in U.S. Pat. No. 4,351,786 to Mueller. The metal core is not threaded and does not extend to the ends of the molded plastic structure. Further, neither the metal core nor the molded plastic structure contain fiber reinforcements.

As illustrated by the number of prior patents, efforts are continuously being made in an attempt to solve the problem of economically fabricating strong, yet light weight articles. None of these patents, however, discloses or suggests the present inventive combination of elements and method steps for reliably, conveniently and economically fabricating strong yet light weight composite fasteners of reinforced resin material as disclosed herein. The present invention achieves its purposes, objectives, and advantages over the prior art through new, useful, and unobvious elements and method steps, with a minimum number of parts, at a reduction of cost in terms of both materials and labor, and through the utilization of readily available materials.

These purposes, objects, and advantages should be construed as merely illustrative of some of the more prominent features and applications of the present invention. Many other beneficial results can be attained by applying the disclosed invention in a different manner or by modifying the invention within the scope of the disclosure. Accordingly, other purposes, objects, and advantages as well as a fuller understanding of the invention may be had by referring to the summary of the invention and detailed description describing the preferred embodiments of the invention in addition to the scope of the invention as defined by the claims taken in conjunction with the accompanying drawings.

SUMMARY OF THE INVENTION

The present invention is defined by the appended claims with the specific preferred embodiments shown in the attached drawings. For the purposes of summarizing the invention, the present invention may be incorporated into a composite fastener including a first member formed from a resin material with high-modulus fibers embedded therein, the first member partially encasing a second member formed in a general fastener shape and which may, but need not, also be made of resin material with high-modulus fibers embedded therein. The resin material may be a thermoplastic resin such as polyetheretherketone and the high-modulus fibers may be formed from, for example, graphite. The high-modulus fibers of the first member are essentially long and continuous and may be oriented generally parallel with a longitudinal axis of the second member. In one presently preferred embodiment, the present inventive fastener may further include a third member with a cone-like shape attached to and engaging the second member adjacent a first end forming a head. This third member may be made from a resin material with short, non-oriented high-modulus fibers embedded therein. The embodiment of the present inventive composite fastener may further include threads formed in the first and second members adjacent a second end.

The invention may also be incorporated into a composite fastener having a first head end and a second threaded or non-threaded end, including a core member formed from an organic resin material with long continuous, high-modulus fibers embedded therein. This embodiment of the present inventive fastener may also include an external shell formed from a resin material with high-modulus fibers embedded therein and oriented generally parallel to a longitudinal axis of the shell. This exterior shell member may be formed from strips consolidated into a star-shaped configuration and preformed into a cup-shaped configuration. These strips being again formed from an organic resin material with long, continuous high-modulus fibers embedded therein along essentially the full lengths of the strips. The resin material for either or both the core and exterior shell members may be a crystalline, polyaromatic, thermoplastic material such as polyetheretherketone, polyethersulfone, Torlon, Xydar and APC-HTX. The fibers for either or both of these members may be from the class of high-modulus materials including graphite and boron.

The invention may also be incorporated into a method of fabricating a composite fastener having a first head end and a threaded or non-threaded second end from thermoplastic compounds. This inventive method includes the steps of (1) providing a core member from an organic resin material with long, continuous high-modulus fibers embedded therein and oriented generally parallel with the axis thereof; (2) providing a plurality of strips from an organic resin material with long, continuous, high-modulus fibers embedded in the strips; (3) consolidating the strips into a star-shaped configuration; (4) preforming the strips into a cup-shaped exterior member; (5) positioning the core member within the exterior member; and (6) consolidating the core member and exterior member together. The method may further include the step of molding a cone-shaped member from organic resin material with short, high-modulus fibers embedded therein and consolidating the cone-shaped member into a cavity formed in a head end of the core member. This method may further include the step of molding threads into the members on the end of the fastener opposite the head end.

BRIEF DESCRIPTION OF THE DRAWINGS

For a more complete understanding of the nature, objects, and advantages of the present invention, reference should be had to the following detailed description taken in conjunction with the accompanying drawings in which:

FIG. 1 is a plan view of a fastener made in accordance with the principles of the invention.

FIG. 2 is a sectional view of the fastener shown in FIG. 1 taken along line 2—2 of FIG. 1.

FIG. 3 is a sectional view of the fastener shown in FIGS. 1 and 2 taken along line 3—3 of FIG. 2.

FIGS. 4A through 4F are schematic showings illustrating the various processing or method steps utilized in manufacturing a fastener in accordance with the principles of the present invention.

FIG. 5 is a sectional view of a core and a core forming/assembly tool, including a mold and a wedge, for fabricating the core of the present invention.

FIG. 6 is a sectional view similar to that shown in FIG. 5 but illustrating the cone-shaped wedge creating a cone-shaped opening in the head end of the core.

FIG. 7 is a view similar to FIGS. 5 and 6 but illustrating a consolidation plunger for compressing the cone-shaped insert plug into the head end of the core.

FIGS. 8A and 8B are a plan view and sectional view of the consolidation mold for joining or consolidating the strips of the overwrap into a star-shaped overwrap blank.

FIG. 9 is a sectional view of a preforming tool for converting the star-shaped overwrap blank of strips into a cup-shaped preform for use as the exterior member of the fastener.

FIGS. 10A and 10B are a plan view and a sectional view, taken along line 10B—10B of FIG. 10A, of a forming tool for joining the preform and the core, the final forming tool being illustrated in FIG. 4E.

FIG. 11 is an elevational illustration of a fastener similar to that shown in FIG. 4F but illustrating a second, or alternate, embodiment of the invention, parts being broken away to show the internal constructions thereof.

Similar reference numerals refer to similar parts throughout the several drawings.

DETAILED DESCRIPTION OF THE INVENTION

This invention relates to design and manufacturing concepts providing a light weight composite fastener 10 as shown in FIG. 2 which meets the rigid structural requirements of the aircraft industry. The fastener uses continuous, high strength fibers 12 embedded in resin matrix 14 as the principal material for an external member 16. In one presently preferred embodiment the fastener 10 also uses high strength long continuous fibers 18 embedded in an organic resin matrix 20 as the material for an internal core member 22. In some embodiments the present inventive fastener may also include an insert plug member 24 having short or chopped high strength fibers 26 embedded in resin matrix 28. The fibers may be graphite or any other high strength, high modulus material such as, for example, boron. The resin matrix may be a thermoplastic compound such as polyetheretherketone or any hard, tough, rigid and formable material. Other fibers and resins, can be used, depending upon the requirements of the particular application. Detail dimension, material thickness and specific compositions, number of plies, and the like are also dependent upon the requirements of the particular application. Overall dimensions, however, will preferably conform with standard aircraft metallic fastener designs.

In the embodiment illustrated in FIG. 2 the fastener 10 may include: (1) An extruded or pultruded unidirectional material core 22 which is wedged open at one end 34 to form a cone-shaped aperture 32 in a conical fastener head shape 36; (2) A molded cone-shaped insert plug 24 inserted into the cone-shaped aperture 32; in the core end 34 forming the fastener head 36; (3) An overwrap or exterior member 16 of unidirectional material strips 38 such as the three sets shown as "X", "Y", and "Z" in FIG. 4A, oriented at 60 degrees to each other across the top of the fastener head 36, and joining at the body or shank 40 to form a continuous sheath about the head 36 and shank 40 of the core 22, with the overwrap and core fibers along the core shank 40 being essentially parallel to one another and the axis 42 of the fastener;

(4) Molded threads 44 in the lower body of the shank; and (5) In an alternate embodiment illustrated in FIG. 11, a braided or mesh-like overwrap 48 may be added to introduce off-axis fibers.

More specifically, and as seen in FIGS. 1, 2, 3, and 4F, there is shown a fastener 10 constructed in accordance with the principles of one of the preferred embodiments of the present invention. The core 22 may be pultruded or extruded or otherwise formed as a generally cylindrical or any other convenient longitudinally oriented member of appropriate diameter which is then cut to length. Extrusion is a manufacturing process of pushing a formable material through a die to form a final product with a cross sectional configuration corresponding to the cross sectional configuration of the die. The core material may be formed to any length and then cut to a length appropriate for any particular application. The core is preferably of a resin material having fibers of a high-modulus material imbedded therein.

In one presently preferred embodiment the first or head end 34 of the core 22 is formed with a cone-shaped recess or aperture 32 for the reception of a molded cone-shaped insert plug 24 to thereby constitute the head 36 of the fastener. The insert plug 24, the second element of the fastener, is preferably also molded of a resin material having high-modulus material imbedded therein. The high-modulus fibers 26 of the insert plug are preferably short fibers, less than about one inch in length and essentially non-aligned.

A third element of the fastener 10 employed in the preferred embodiment illustrated in FIG. 2 is the overwrap or external member 16. The overwrap essentially encompasses the insert plug 24 and entire length of the core shank 40. The second end 50 of the fastener, the threaded end, that end remote from the head end 34 is also preferably covered by the overwrap 16 but may alternatively be devoid of the overwrap thus leaving portions of the core exposed at this second or threaded end. The overwrap 16 is preferably fabricated from a resinous material having high-modulus fibers 12 along the entire length thereof essentially parallel with the axis 42 of the fastener core and extending transversely across the head end of the fastener.

The head 36 thus includes a flat end 34 with a conically tapered section 52 terminating in the cylindrical shank 40. Threads 44 are formed in the end 50 of the shank remote from the head 36.

The fibers 12 of the strips 38 forming the overwrap extend the entire length of the overwrap for greater tensile strength adjacent the surface area of the fastener where such tensile strength is beneficial for fastener applications.

The resin material 14, 20 and 28 for the core 22, plug 24, and overwrap 16 is preferably a thermoplastic organic polymer typically having the characteristics of being hard, tough, rigid, generally temperature resistant, and formable at elevated temperatures. The formability of the resin allows it to be shaped into a fastener structure including the components thereof. The other characteristics are also found to be highly desirable for use as fasteners in aircraft applications.

Typical resins which meet these qualifications include polyetheretherketone, polyethersulfone, TORLON (TORLON is a trademark of E. I. duPont de Nemoirs & Company of Wilmington, Del.), XYDAR (XYDAR is a trademark of Dart & Kraft of Northbrook, Ill.), and APC-HTX (APC-HTX is a trademark of Imperial Chemical Industries of London, The United Kingdom). One presently preferred resin is polyetheretherketone, a crystalline, polyaromatic, thermoplastic polymer which satisfies the rigid requirements for fasteners usable in the aircraft industry. The thermoplastic compounds typically allow for reforming under heat and/or pressure. This is a highly desirable feature to facilitate the manufacturing of a fastener. The polyaromatic characteristic defines the polymer as having a multiple organic ring structure.

In one of the presently preferred embodiments all of the above referred to elements of the fastener are fabricated from polyetheretherketone resin material. Other resin materials, however, including those enumerated above, and yet further additional similar materials, could be utilized if other more or less stringent requirements are acceptable or desired. Similarly, differing resin materials may be utilized for the different components of the fastener, thus all components of a single fastener need not necessarily employ the same resin. When, however, the same resin material is used for the various components of the fastener, the manufacturing processes discussed below will fuse together the components into a single unified composite structure, eliminating bond lines at the areas of fusion or consolidation thus increasing the overall strength of the fastener.

The strands or fibers 12, 18 and 26 are preferably formed of a material of high strength which may also be high-modulus and are embedded within the resin material 14, 20 and 28 to further increase the tensile and shear strength of the fastener during operation and use. One presently preferred fiber is aerospace grade graphite, but the fibers might also be selected from any of the class of well known strong, high-modulus fibers such as boron or lower modulus but high tensile strength materials such as KEVLAR (KEVLAR is a trademark of E. I. duPont de Nemours and Company of Wilmington, Del.), or even some glass compounds.

The basic inventive manufacturing process for the fastener embodiment illustrated in FIG. 2 is shown schematically in FIGS. 4A through 4F and includes the method steps as follows: (1) Cut the overwrap plies or strips 38, typically the width of each ply in a "three-strip" design is approximately one-sixth of the fastener shank circumference; (2) Lay-up the plies in the consolidation mold 56 and apply heat and pressure to form a flat consolidated star-shaped blank 58 with multiple horizontal arms, typically, in a "three-strip" design, each ply being oriented at 60 degrees to the previous ply (FIG. 4A); (3) Press the consolidated blank 58 into a heated, preforming tool 60 to bend the arms into a vertical position, thus making a preformed overwrap 62 (FIG. 4B); (4) Cut the core material 22 to length; (5) Form the fastener head 36 in the core blank by placing the core blank into a mold 64 and using, for example, a cone-shaped wedge 66 so as to split open and form a cavity or aperture 32 in one end 34 of core blank 22 while heating the head end 34 of the core 22, preferably locally, to soften the material (FIG. 5); (6) Install the molded insert plug 24 into the cavity or aperture 32 formed in the core blank (FIG. 6) and consolidating the insert plug 24 and core 22 under heat and pressure (FIG. 7); (7) Install the completed core 22 in the preformed overwrap 62 and locate in the forming tool 70 to form and consolidate the overwrap arms around the core using heat and pressure forming assembly 68; (9) Place the assembly 68 in the final forming tool 74 and apply heat and pressure to flatten the head 36 and form the threads 44 (FIG. 4E) to form the fastener 10 (FIG.

4F). In an alternate embodiment illustrated in FIG. 11, a braided overwrap 48 is placed over the fastener 10 prior to placing the fastener into the final forming tool 74.

More specifically, the manufacturing process of the present invention for fabricating the above-described fastener can be understood with reference to the Figures. As shown in FIG. 4A, a plurality of strips 38 are overlayed in the shape of a six-pointed star. The centers 76 of the strips 38 intersect at the axis 42 of the fastener 10 and are perpendicular thereto. The strips 38 are each of a common length to extend from their centers across the first or head end 34 of the fastener 10, down the fastener to the second or threaded end 50. The width of each strip is one-sixth of the diameter of the finished fastener. It should be understood that portions of the head end 34 might not be totally covered by the strips 38 if the strips are merely rectangular. The strips may therefore be provided with enlarged areas 78 adjacent their centers at the region or head end 34 of the fastener 10. Note FIG. 4A and FIG. 8A. The enlarged areas 78 are typically formed from strips 38 of a width at least equal to the width of the widest portion of the strip that are cut to the desired size and shape shown in FIGS. 4A and 8A.

The star-shaped overwrap is then made into a composite element or blank 58 by the application of both heat and pressure through a consolidation mold 56 as illustrated in FIGS. 8A and 8B.

The star-shaped overwrap blank 58 is then converted into a preformed overwrap 62 through the use of a preforming tool 60 as of the type shown in FIG. 9. The preforming tool 60 allows the insertion of the rigid overwrap blank 58 into a horizontal aperture 80. Heat is applied to the mold to make the blank pliable. A plunger 82 is then moved axially into the cylindrical mold cavity 84 to force the central portion of the blank into the mold cavity which is of a length to receive the complete preformed overwrap while the diameter of the mold cavity and plunger are of a size to receive the enlarged head 36 of the core.

FIG. 4C illustrates the completed core 22 whereas FIGS. 5, 6, and 7 illustrate the forming of the core by the core forming/assembly tool or mold 64. After extrusion, the core is further formed by inserting an extruded, cut to length core blank 22 into a cylindrical cavity 86 in the lower half 88 of the mold and applying heat to the mold, preferably locally to the top portion of the mold 88 adjacent the head end of the fastener. The heat is sufficient to make the resin pliable whereupon a cone-shaped wedge section 66 formed on the upper mold 92 will deform the head end of the core blank 22 into the final shape of the head. The cone-shaped wedge 66 is then removed and the molded insert plug 24 is inserted into the aperture 32 created by the wedge 66. A second upper mold piece consolidation plunger 94, then is employed to apply pressure to the insert plug 24 to complete the joining or consolidation of the core 22 and insert plug 24 as well as the flattening of the head end 34 of the core and the insert plug.

The main body portion or shank 40 of the core is extruded to, and remains at, a common cross-sectional diameter from adjacent the head to, and including, the threads. Thus the preform overwrap 62 will totally cover the central core or core member 22 to provide the desired added strength in the area subject to the greatest tensile forces during operation and use.

The preformed overwrap 62, with the completed core 22 therein, are then placed into a cylindrical cavity 96 in a forming tool 70 as shown in FIGS. 10A and 10B. Heat is applied to the mold concurrently with pressure in the nature of radial forces applied by radially reciprocating the mold segment 98. These forces applied by the mold segments provide the fastener shape and join or consolidate the core and overwrap.

Lastly, a final forming tool 74 is employed to form the threads 44 into the overwrap 62 and core 22 adjacent the threaded or second end 50 concurrently with the flattening of the head 36 at the first or head end 34. This is accomplished by inserting the consolidated assembly 68 from the forming tool 70 into the cylindrical cavity 100 in the final forming tool 74 as shown in FIG. 4E and applying axial pressure with rams 102 and 192 while locally applying heat to each end of the fastener structure sufficient to render the fastener ends pliable.

The organic resin material of the disclosed preferred embodiment and, therefore, the core, insert plug, and strips are generally essentially rigid at normal room temperatures but may be made pliable upon the application of pressure and heat to the various molds. For thermoplastic fastener materials these temperature are in the area of 700 degrees Fahrenheit (371 degrees Centigrade) or above.

The tooling for effecting the above described inventive method steps include the following: (1) The consolidation mold 56 such as shown in FIGS. 8A and 8B; (2) The preforming tool 60, shown in FIG. 9, including upper and lower mold portions 132 and 134, and a plunger 82 which presses the flat blank 58 into a mold cavity 84 of the desired shape; (3) The core forming/assembly tool 64 including a lower half cavity mold 88, a cone-shaped wedge member 92, and a consolidation plunger member 94 such as shown in FIGS. 5, 6, and 7 and which form the fastener head in the core blank and consolidate it with the molded insert plug; (4) The forming tool 70, shown in FIGS. 10A and 10B, which may be a cam-operated, multi-jaw mold for forming and consolidating the preformed overwrap arms around the completed core; and (5) A final forming tool 74, shown in FIG. 4E, which may contain the final fastener geometry and include the plungers 102 and 192 to finish-form the fastener head 36 and mold the threads 44 into the shank body 40.

The tooling disclosed herein may be considered as being of a prototype nature as for short production runs or custom jobs and is disclosed for illustrative purposes only. It should be understood, however, that the tooling and methods of the present invention are readily adapted for high production techniques.

The consolidation mold 56 is a two-piece member, each shaped cylindrically, with alignment pins 110 extending upwardly from apertures in the lower piece 112 of the mold into aligned apertures in the upper piece 114 of the mold. The alignment pins 110 allow for the precise positioning of the strips 38 with respect to each other within the mold. The alignment pins also allow the positioning of the upper piece 114 of the mold with respect to the lower piece 112. The upper piece has a dished out segment 116 with an enlarged central portion 118 to receive the strips including the excess thickness at the center of the strips where they are overlaid. The upper piece has a downwardly extending circumferential lip 120 for being received in a circumferential recess 122 to insure proper mating and heat retention during operation and use. Shims or spacers 124 may be positioned between the mold pieces, or alternatively, built into the tool to effect a proper spacing between opposed faces of the mold pieces during consolidation of the strips. The required heat is applied by heat generating mechanisms 126 which may be disposed within the mold to render the materials pliable. A temperature sensor 128 may also be disposed within the mold and coupled with the heater to insure that the appropriate temperature is not exceeded.

The preforming tool 60 as shown in FIG. 9 is also formed of two mating pieces, the upper piece 132 and the lower piece 134. A horizontal opening 80 is formed centrally at the interface of the mold pieces to allow the placement of the star-shaped blank therebetween. The upper piece 132 has a downwardly extending circumferential lid 136 for being received in a circumferential recess 138 to insure proper mating and heat retention during operation and use. The required heat is applied by a heat generating mechanism 142 which may be disposed in the mold to render the materials pliable while a temperature sensor 144, which may also be in the mold, is coupled with the heater to insure that the appropriate temperature is not exceeded. Only the mold region proximate the opening 80 need be heated, the lower portion of the mold 134 is preferably below 500 degrees Fahrenheit. A plunger 82 is inserted in an aperture 84 in the upper mold piece 132 to drive the central portion downwardly into aperture 146 until it bottoms on the upper surface 148 of a knockout pin 150. After reaching the desired temperature and the insertion of the plunger, the mold is separated and the strips removed, now formed in the desired cup-shaped configuration as shown in FIG. 4B.

The core joining/forming assembly tool 64 as illustrated in FIGS. 5, 6 and 7 includes a cylindrical cavity mold 88 which is used in association with two additional mold pieces 92 and 94. The cavity mold 88 is essentially cylindrical in shape includes a generally cylindrical cavity 86 for receiving the extruded core and also has an associated bottoming surface 152. The upper portion of the cavity mold includes tapers 154 which extend upwardly to an enlarged cylindrical section 156 for receiving on or the other of the associated mold pieces. These associated pieces are the conically shaped aperture forming mold member 92 and the compression member 94. Each of these members terminates in an upper cylindrical portion for being received within the upper enlarged cylindrical portion of the cavity mold. Heat generating mechanisms 158 apply heat to the cavity mold 66 preferably only locally since only the upper portion or head end of the core is to be molded by this cavity mold. When the appropriate temperature is reached, a heated mold piece 92 with the cone-shaped section 66 is mated with the cavity mold to form a cone-shaped aperture 32 in the head end of the core. While the mold is still at an operating temperature, the cone-shaped mold section 66 is removed and the cone-shaped insert plug 24 is positioned in the aperture. Thereafter, the second mold piece, compression member 94, is utilized to apply compressive pressure to the head end of the core to join or consolidate the plug insert and the core. Upon preferably, first cooling and subsequently removing the compression member, the formed core becomes rigid and may be utilized for further fabrication of the fastener. As can be understood, a temperature sensor 160 coupled with the heater 158 is preferably utilized to insure that the temperature of the mold does not exceed that which is desired for the particular materials employed. A similar heating arrangement is also provided for mold element 92 to heat the mold section 66.

Joining of the cup-shaped preform structure with the inserted fastener core structure is effected by the forming tool 70. The forming tool allows the insertion of the elements in the fastener, the core within the preform, in a central vertical aperture or cavity 96 head-end down. The required heat is applied by heat generating mechanisms 162 in the mold to render the materials pliable while a temperature sensor 164, also in the mold and coupled with the heater, will insure that the appropriate temperature is not exceeded. A handle 168 is moved clockwise as seen in FIG. 10A around the axis 42 of the fastener and its component elements. The action of the handle rotates a cam 170 with six surfaces 172 to move six associated cam followers 174 radially inward toward the fastener axis and the fastener. The followers include six mold segments 98 with pins 176 fixedly extending therethrough. The pins extend through both the upper and lower faces of the mold segments and are mounted for radial sliding motion in fixed radial slots 178 above and below the mold segments. Consequently, movement of the handle clockwise as seen in FIG. 10A will move the six mold segments 98 radially toward each other with their surfaces 180 contacting the fastener being molded to join or consolidate the core and overwrap to thereby create the fastener assembly 68. Counter rotation of the handle will allow the movement of the mold segments away from each other. Pins 182 on the fixed base plate 184 constrain the handle and cam for rotational movement.

The last tool required in the manufacture of the fastener of the present invention is the final finishing tool 74 as shown in FIG. 4E. The final finishing tool is a cylindrical mold 186 to receive the fastener after the finishing step with the forming tool as shown in FIGS. 10A and 10B. The final finishing tool is cylindrical in shape with an essentially cylindrical cavity having threads 188 at the lowermost end thereof and a tapering segment 190 to receive the enlarged head end. A ram 102 is provided for use in association therewith to urge the fastener downwardly toward a bottom ram 192 located adjacent the bottom of the threads to thereby create the threads in the overwrap and core in the lower or second end of the fastener. The ram 102 in association with the mold also forms the flat head at the first or head end of the fastener. The required heat is applied by heat generating mechanisms 194 locally to the head and thread ends of in the mold to render the ends of the fastener pliable while temperature sensors 196, also in the mold, are coupled with the heaters to insure that the appropriate temperature is not exceeded.

The heat generating mechanisms for all of the various molds described above are designed to reach a temperature of about 700 degrees Fahrenheit (371 degrees Centigrade). Such temperature is appropriate to render pliable the materials of the disclosed preferred embodiment. The temperature sensors, associated with the heaters, control such temperatures in a known manner. It should be appreciated that other temperatures, greater or lesser than that described above, may be utilized for materials other than those of the disclosed preferred embodiment.

By way of example only, the fastener of the present preferred embodiment may be a 3-inch bolt with a quarter-inch diameter shank and half-inch diameter head. In such situation, a one-eighth inch thick overwrap would be provided with 0.0004 inch (0.001 centimeter) diameter fibers centrally disposed in the overwrap and also disposed throughout the core and insert plug. It should be realized, however, that these sizes are by way of example only since greater or lesser sizes could be employed and with different molding times and temperatures utilized, all within the preview of one skilled in the art.

In an alternate form of the embodiment, additional strength may be provided to the final fastener by the adding of a mesh-like or braided overwrap 48 to the external surface of the fastener 10 at crossing angles with respect to the axis 42 and circumference of the fastener 10 prior to insertion into the final finishing tool 74 for final shaping and consolidation. The mesh-like overwrap is a mesh formed as a tube, for example, by any conventional braiding machine. The addition of the overwrap to the fastener adds strength to the fastener in other than the axial direction. The mesh-like overwrap is preferably formed of the same material, 0.0004 inch (0.001 centimeter) graphite for example, as the fibers of the core, insert plug, and overwrap.

The present disclosure includes that information contained in the appended claims as well as that in the foregoing description. Although the invention has been described in its preferred forms or embodiments with a certain degree of particularity, it is understood that the present disclosure of the preferred forms has been made only by way of example and that numerous changes in the details of construction, fabrication and use, including the combination and arrangement of parts and steps, may be resorted to without departing from the spirit and scope of the appended claims.

What is claimed is:

1. A composite fastener comprising: a first outer member formed in a cup-like shape from a resin composite material including a plurality of long high-modulus fibers embedded therein and arranged into a configuration extending over and intersecting each other across the bottom of said cup-like shape; and
    a second inner member formed in a cylindrical shape from a resin material with high-modulus fibers embedded therein, said second member being located within said first member.
2. The composite fastener as set forth in claim 1 wherein said resin material is thermoplastic.
3. The fastener as in claim 1 in which said outer member, when formed into said cup-like shape, acquires a smooth exterior surface continuous of said resin material without joins across the bottom thereof.
4. The composite fastener as set forth in claim 1 wherein said resin material is polyetheretherketone.
5. The composite fastener as set forth in claim 4 wherein said high-modulus fibers are formed from graphite.
6. The composite fastener as set forth in claim 5 wherein said high-modulus fibers are oriented generally parallel with the axis of said second member with the fibers of said second member being short and chopped and the fibers of said first member being long and continuous.
7. The composite fastener as set forth in claim 6 and further including a third member formed in a cone-like shape from a resin material with short and chopped high-modulus fibers embedded therein, said third member being located within said second member adjacent a first end with its fibers being oriented generally parallel with the axis of said second member.
8. The composite fastener as set forth in claim 7 and further including, threads formed in said first and second members adjacent a second end.
9. An essentially cylindrical composite fastener having a first head end and a second threaded end including:
    an interior cylindrical core member formed from an organic resin material with short, chopped, high-modulus fibers embedded therein;
    an exterior member formed from strips consolidated into a star-shaped configuration and preformed into a cup-shaped configuration, said strips being formed from an organic resin material with long, continuous, high-modulus fibers embedded therein for the full lengths of the strips.
10. The fastener set forth in claim 9 and further including a cone-shaped molded insert plug formed from an organic resin material with short, chopped, high-modulus fibers embedded therein, said insert plug being molded into said interior cylindrical core member adjacent the first head end.
11. The fastener as set forth in claim 10 and further including threads molded into said exterior member and said interior cylindrical core member adjacent the second threaded end.
12. The fastener as set forth in claim 11 wherein said fibers in said exterior member and said interior cylindrical core member are all oriented in the same direction, essentially parallel with the axis of the fastener.
13. The fastener as set forth in claim 9 wherein said resin material for at least one of said members is a crystalline, polyaromatic, thermoplastic material.
14. The fastener as set forth in claim 9 wherein said resin material for at least one of said members is from the class of hard, tough, rigid, temperature resistant, solvent resistant, formable materials including polyetheretherketone, polyethersulfone, Torlon, Xydar, and APC-HTX.
15. The fastener as set forth in claim 9 wherein said resin material for both said members is polyetheretherketone.
16. The fastener as set forth in claim 9 wherein said fibers for at least one of said members is from the class of high-modulus materials including graphite, boron, glass and Kevlar.
17. The fastener as set forth in claim 15 wherein said fibers for both of said members is graphite.
18. The fastener as set forth in claim 9 and further including a mesh-like overwrap of graphite fibers molded into the exterior surface of said fastener.

* * * * *